United States Patent [19]
Schultz

[11] Patent Number: 6,155,595
[45] Date of Patent: Dec. 5, 2000

[54] KNEE PROTECTION DEVICE FOR VEHICLE OCCUPANTS

[75] Inventor: Dirk Schultz, Schwäbisch Gmünd, Germany

[73] Assignee: TRW Occupant Restraint Systems GmbH & Co. KG, Alfdorf, Germany

[21] Appl. No.: 09/298,693

[22] Filed: Apr. 23, 1999

[30] Foreign Application Priority Data

Apr. 23, 1998 [DE] Germany .......................... 298 07 424

[51] Int. Cl.⁷ .................................................. B60R 21/16
[52] U.S. Cl. .................... 280/729; 280/730.1; 280/743.2
[58] Field of Search ................... 280/729, 730.1, 280/743.2

[56] References Cited

U.S. PATENT DOCUMENTS

| | | | |
|---|---|---|---|
| 3,752,501 | 8/1973 | Daniel et al. | 280/729 |
| 3,767,225 | 10/1973 | Mazelsky | 280/729 |
| 3,843,150 | 10/1974 | Harada et al. | 280/729 |
| 4,360,223 | 11/1982 | Kirchoff | 280/729 |
| 5,458,366 | 10/1995 | Hock et al. | 280/729 |
| 5,513,877 | 5/1996 | Mac Brien et al. | 280/732 |
| 5,536,043 | 7/1996 | Lang et al. | 280/753 |

FOREIGN PATENT DOCUMENTS

| | | |
|---|---|---|
| 0422840 | 4/1991 | European Pat. Off. . |
| 2109637 | 9/1972 | Germany . |
| 4121659 | 1/1993 | Germany . |
| 19701709 | 7/1998 | Germany . |

*Primary Examiner*—Kenneth R. Rice
*Attorney, Agent, or Firm*—Tarolli, Sundheim, Covell, Tummino & Szabo L.L.P.

[57] ABSTRACT

A knee protection device for vehicle occupants comprises a gas bag having a gas bag wall with opposing sections. The gas bag, in its installed and inflated state, extends in front of the knees of the occupant of the vehicle, lies against the knees in the case of restraint and is intended to largely prevent the knees from moving forward. The device further comprises means in the gas bag which connect the opposing sections of the gas bag wall. The means are fixed to the sections of the gas bag wall and are arranged in such a way that they counteract a change of shape of the gas bag on plunging in by the knees.

12 Claims, 2 Drawing Sheets

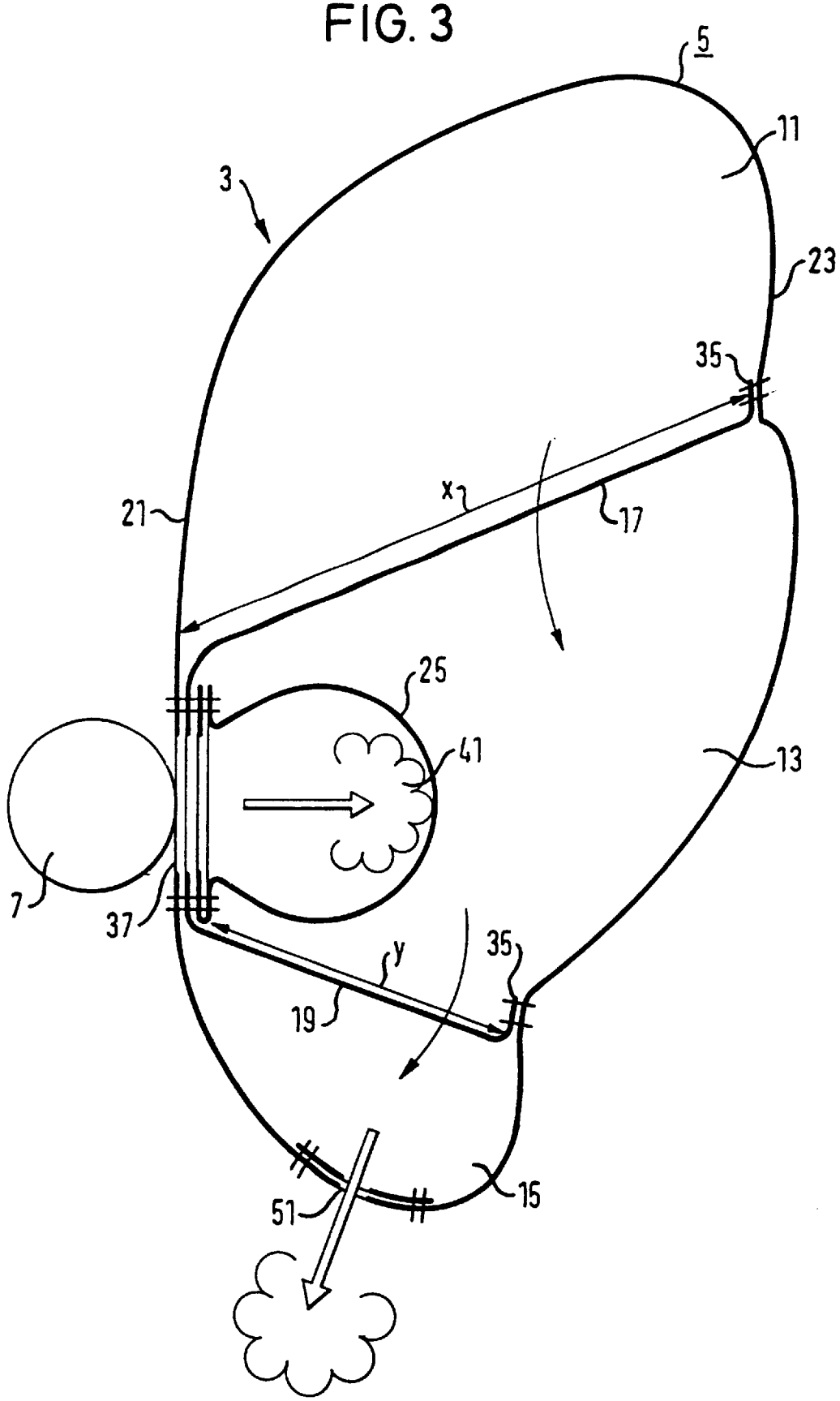

KNEE PROTECTION DEVICE FOR VEHICLE OCCUPANTS

TECHNICAL FIELD

The invention relates to a knee protection device for vehicle occupants.

BACKGROUND OF THE INVENTION

There are various principles hitherto for knee protection devices. On the one hand, systems are known in which a padded plate is moved toward the knees of the occupant in the case of restraint, in order to prevent them from moving. On the other hand, there are knee protection devices with tubular gas bags which in the case of restraint emerge from the instrument panel and extend in front of the knees of the occupant, so that the knees lie directly against the gas bag (and not against a padded plate) and are restrained by the gas bag. In the second system which relates to the present invention, however, there are some disadvantages. Thus the restraining effect of this system depends very much on the size of the contact surface of the gas bag to the occupant. When the knees plunge into the gas bag, the internal pressure of the gas bag increases. However, if the contact of the occupant takes place over a very small area, only a small volume of gas can be displaced, so that the pressure rise in the airbag is very small. This effect is additionally amplified in that the airbag bulges out at different places when the knees plunge into it, which leads to a reduction to the change in volume and reduces the pressure increase. With a small pressure increase, however, only smaller restraining forces are able to be achieved. A further disadvantage relates to the application of the restraining force on the vehicle occupant. In the conventional system, a large part of the force is not introduced into the knee, as required, but rather into the shin bones, because in the case of restraint the occupant lies against the gas bag over a large part of the shin bones up to the knees. The biomechanical reasons (risk of injury) the introduction of force into the shin bones must be minimized.

BRIEF SUMMARY OF THE INVENTION

The invention provides a knee protection device which is distinguished by the application of a high and selective restraining force in the region of the knees. The knee protection device according to the present invention comprises a gas bag having a gas bag wall with opposing sections. The gas bag, in its installed and inflated state, extends in front of the knees of the occupant of the vehicle, lies against the knees in the case of restraint and is intended to largely prevent the knees from moving forward. The device further comprises means in the gas bag which connect the opposing sections of the gas bag wall. The means are fixed to the sections of the gas bag wall and are arranged in such a way that they counteract a change of shape of the gas bag on plunging in by the knees. The invention is based on the knowledge that in fact in gas bags in which the inertia forces by the vehicle occupant moving forward act on a small area on it, a stabilizing of its shape is very important. The means for stabilizing the shape of the gas bag are, for example, limiting straps inside the gas bag and/or dividing walls, to form several chambers. Limiting straps reduce the distance between opposite portions of the gas bag wall, which portions are connected by the straps, compared with a gas bag without the straps.

According to the preferred embodiment, the limiting straps are arranged in such a way that the lower part of the gas bag, in the installed and inflated state, which lies in the region of the shin bones in the case of a driver of average size, has a smaller volume and/or a smaller depth than the upper part of the gas bag, which is hit by the knees of the occupant. Thereby, an attempt is made to provide a distance between the shin bones and the gas bag, so that the shin bone no longer has to take up any restraining forces, but rather the available restraining forces are introduced as fully as possible into the knees.

With the provision of one or more dividing walls as means for stabilizing the shape of the gas bag, the dividing wall has at least one overflow opening. If a knee strikes onto a chamber, then the displaced air will endeavor to arrive via the overflow opening into the other chamber. However, this takes place with a great time lag, because the overflow opening acts like a throttle. Hence as a whole a more stable structure of the gas bag is produced with an external action of force. With the provision of several small chambers, in addition, a faster pressure rise takes place.

Preferably, the dividing wall additionally also acts as a limiting strap. The dividing wall hence has a dual function. According to the preferred development, in installed and inflated state of the gas bag the dividing wall extends over approximately the entire width of the inflated gas bag, however, the dividing wall being not secured to or not secured over the entire depth to the gas bag wall. Thereby, overflow ducts are produced on the sides. On unfolding of the gas bag, the dividing walls hardly have a disadvantageous effect with respect to the inflation speed, because in the non-inflated state the gas bag is wider than in the inflated state and large through-flow openings form between the sides of the dividing wall and the lateral sections of the gas bag wall. These over-wide openings permit a rapid overflow of the gas entering into the gas bag from one chamber into the other. Preferably, the dividing wall extends transversely to the vehicle occupant, i.e. in transverse direction of the vehicle. Furthermore, the dividing wall additionally extends preferably from a rear section of the gas bag wall, which is close to the instrument panel of the vehicle, up to the front section facing the occupant.

In order to optimize the unfolding process, preferably a flame protection wall is arranged in the gas bag, which forms a distributor chamber for the inflowing gas and onto which the inflowing gas stream strikes. The flame protection wall is fastened to the rear section of the gas bag wall and in the inflated state is spaced apart from the front section of the gas bag wall. In addition, it is laterally open, so that the incoming gas firstly unfolds the gas bag laterally and hence positions it correctly. Then the gas bag unfolds mainly in the direction of the knees of the occupant.

BRIEF DESCRIPTION OF THE DRAWINGS

FIG. 3 shows an enlarged cross-sectional view of the knee protection device according to FIG. 1.

DETAILED DESCRIPTION OF A PREFERRED EMBODIMENT

Figure 1:
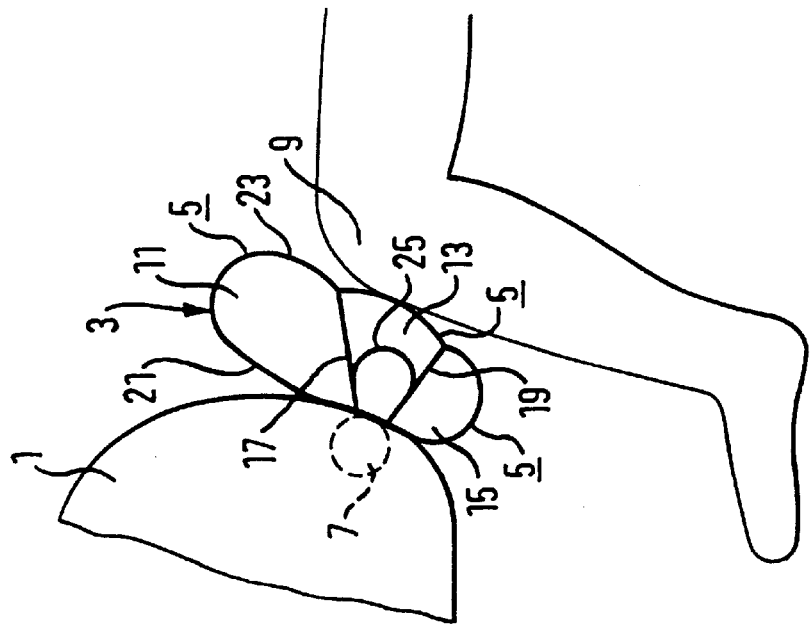
FIG. 1 shows a cross-sectional view of the knee protection device according to the invention, in the installed and inflated state.

In FIG. 1 a knee protection device is shown which is accommodated in an instrument panel 1 in the vehicle at the knee level of the vehicle occupant. The knee protection device comprises substantially a gas bag 3 with a gas bag wall 5 and a gas generator 7 for the unfolding of the gas bag. The gas generator 7 is arranged hidden behind the instrument panel 1. On unfolding, the gas bag 3 emerges from the instrument panel and pushes itself between the latter and the knees 9 of the occupant. The gas bag 3 has several chambers 11, 13, 15, which are formed by two dividing walls 17 and 19. The dividing walls 17, 19 connect a rear section 21 with a front section 23 of the gas bag wall 5. The rear section 21 faces the instrument panel 1 and the front section 23 faces the vehicle occupant. The dividing walls 17, 19 also act as limiting straps because the are constructed so short that they substantially codetermine the shape of the gas bag in the inflated state, by holding the front section 23 closer to the rear section 21 than would be the case in a corresponding gas bag without dividing walls 17, 19. In the central chamber 13 in addition a flame protection wall 25 is present, which is explained in further detail with the aid of FIG. 3.

Figure 2:
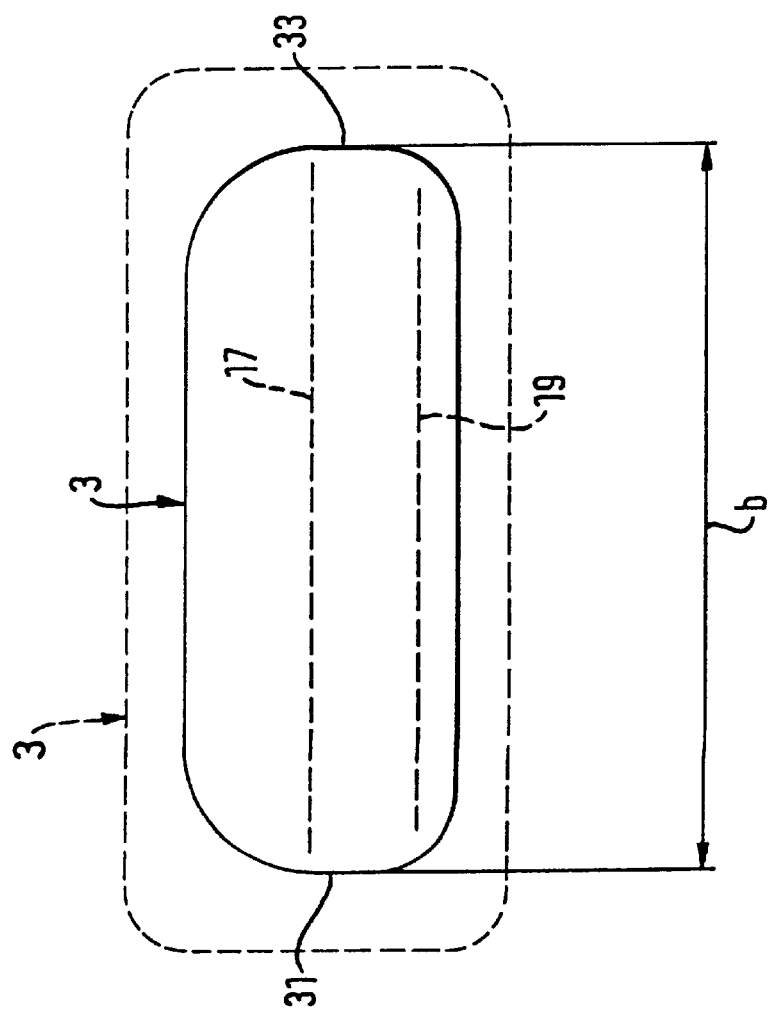
FIG. 2 shows a front view of the inflated gas bag as part of the knee protection device according to FIG. 1.

In FIG. 2 the gas bag 3 is illustrated with broken lines in spread, unfolded state and with continuous lines in inflated state. The gas bag 3 is very wide, so that it covers all possible points of knee impact in the case of restraint. As can be seen from FIG. 2, on inflation the width of the gas bag 3 reduces to a measure b. The dividing walls 17, 19 extend almost over the entire width b. The dividing walls 17, 19 are only arranged on the front and on the rear section 23, 21, not, however, on the sides 31, 33 of the gas bag wall 5. Hence, slit-like overflow openings are produced on both sides of the dividing walls 17, 19 between the latter and the sides 31, 33.

It can be seen in FIG. 3 that the dividing walls 17, 19 consist of a fabric piece. This piece has opposing edges 35 at which it is sewn to the front section 23 of the gas bag wall 5. A central piece of the part is sewn on the rear section 21 in the region of the inflation opening 37 of the gas bag and has a recess in the region of the inflation opening 37. The part forming the dividing walls 17, 19 therefore represents a reinforcement of the edge of the inflation opening 37. The flame protection wall 25 together with the part which forms the dividing walls 17, 19 is sewn on the edge of the inflation opening 37 and likewise forms a reinforcement of the edge of the inflation opening 37.

In inflated state, the flame protection wall 25 has approximately the shape of a cylinder which is laterally open. Through the flame protection wall 23, a distributor chamber 41 is formed for the gas produced b, the gas generator 7, which flows into the gas bag 3. The length of the dividing walls 17, 19 differs. Whereas the dividing wall 17 has a relatively great length x, the dividing wall 19 with length y is rather short. Hence also the depth of the gas bag in the lower cart is distinctly less than in the upper part. This has the advantage that in the lower part of the gas bag a distance is achieved between the shin bones of the occupant (cf. FIG. 1) and the gas bag 3, so that contact between the gas bag and the occupant only occurs in the region of the knees. Hence the restraining force is principally introduced into the knees, where it can develop the greatest restraining effect for the lower body region and the upper thigh region.

At the lower end of the gas bag in addition an outflow opening 51 is provided, which does not open until a certain pressure occurs inside the gas bag. In addition, or alternatively, of course outflow openings can also be provided which are always open (not shown).

The function of the knee protection device in the case of restraint is explained below. As soon as the gas generator 7 is activated, gas flows via the inflation opening 37 into the interior of the gas bag. The gas bag will firstly unfold slightly in the direction of the occupant, until the distributor chamber 41 is formed. The gas flow strikes onto the flame protection wall 25 and, after it has divided itself, it is deflected laterally. The gas bag then unfolds almost exclusively laterally and thereby already positions itself at a very early moment. The gas flows laterally from the distributor chamber 41 into the central chamber 13. As a wide slit still exists at the start of the unfolding process between the dividing walls 17 and 19 and the sides 31, 33 of the gas bag, a rapid overflowing of the gas also into the other chambers 11, 15 takes place. The gas bag unfolds upwards, downwards and in the direction of the occupant, until it has reached its full size.

In this state, the dividing walls 17, 19 lie laterally almost or even completely against the sides 31, 33. The position of the gas bag is selected such that the knees of the occupant strike onto the central chamber 13. The knees penetrate into the gas bag and lead to a displacement of gas. This would normally lead to a bulging out of the gas bag wall 25 in regions which are not touched by the knees. Owing to the dividing walls 17, 19 acting as limiting straps, the shape of the gas bag is substantially maintained, however, so that the internal pressure of the gas bag rises distinctly on impact of the knees. The gas displaced by the knees endeavors to arrive into the other chambers 11, 15 via the overflow openings. However, as the overflow openings are relatively small in the fully inflated state, a flow resistance occurs which first has to be overcome so that the overflowing takes place in a delayed manner. Also thereby the internal pressure of the gas bag can rise sharply, which produces a high restraining force. The overflow behavior and hence the course of the pressure rise can be easily adjusted by altering the width of the dividing walls 17, 19 in relation to the width of the gas bag. In order to reduce force peaks, the outflow opening 51 is opened on reaching a predetermined value owing to the internal pressure, so that gas, as indicated by an arrow, can flow out from the gas bag 3.

The optimum position and shape of the gas bag with regard to the position of the knees and of the shin bones of the occupant can be set by the length x, y of the dividing walls 17, 19 and their attachment points at the gas bag wall 5. Instead of the dividing walls 17, 19 a plurality of limiting straps having a reduced broadness can be arranged adjacent to each other. Such limiting straps have the design of the dividing walls, seen in cross section of FIG. 1. The advantages of the knee protection device as shown are essentially:

Rapid and correct positioning of the gas bag in the unfolding process.

Reduction of the change of shape of the gas bag when the knees plunge in, through the provision of means in the gas bag which counteract the change of shape (limiting strap and dividing wall).

Rapid pressure rise and hence reaching of a high restraining force.

Accurate positioning of the sites of introduction of the restraining force into the occupant.

Very favorable manufacture of the gas bag through the combination of dividing walls, limiting straps and the flame protection wall.

What is claimed is:

1. A knee protection device for vehicle occupants, said device comprising a gas bag having a gas bag wall with opposing sections, said gas bag, in its installed and inflated state, extending in front of the knees of the occupant of the vehicle, lying against the knees in the case of restraint and being intended to largely prevent the knees from moving forward, and means provided in said gas bag which connect said opposing sections of said gas bag wall, which are fixed to said sections of said gas bag wall, and which are arranged in such a way that they counteract a change of shape of said gas bag on plunging in by the knees.

2. The knee protection device according to claim 1, further comprising a gas generator for inflating said gas bag.

3. The knee protection device according to claim 1, wherein said means comprise at least one limiting strap arranged in said gas bag.

4. The knee protection device according to claim 3, wherein, in the installed and inflated state of said gas bag, said gas bag has an upper and a lower part, said lower part having at least one of a smaller volume and a smaller depth than said upper part by said at least one limiting strap provided in said lower part.

5. The knee protection device according to claim 1, wherein said means comprise at least one dividing wall provided in said gas bag which connects opposing sections of said gas bag wall with each other and divides the interior of said gas bag into chambers, said dividing wall having at least one overflow opening which provides a flow connection between said chambers.

6. The knee protection device according to claim 5, wherein said dividing wall forms a wide limiting strap.

7. The knee protection device according to claim 5, wherein said dividing wall, in the installed and inflated state of said gas bag, extends over approximately the entire width of said inflated gas bag, said dividing wall being laterally not secured to or not secured over the entire depth to said gas bag wall.

8. The knee protection device according to claim 5, wherein said gas bag wall has a rear section and a front section lying opposite thereto and facing the knees of the occupant, and wherein said dividing wall extends from said rear section to said front section.

9. The knee protection device according to claim 8, wherein said gas bag has an inflation opening at said rear section of said gas bag wall, wherein two dividing walls formed from one part are provided, each of which connecting said rear and said front section with each other, said part constituting said dividing walls having opposing edges and a central piece and being secured with said edges to said front section and with said central piece to said rear section of said gas bag wall.

10. The knee protection device according to claim 9, wherein said central piece is fastened to said gas bag wall in a region close to said inflation opening and defines a reinforcement of an edge of said piece surrounding said inflation opening.

11. The knee protection device according to claim 1, wherein said gas bag has an inflation opening in its wall, and wherein a flame protection wall is arranged in said gas bag, which forms a distribution chamber for inflowing gas, said inflowing gas striking directly onto the flame protection wall.

12. The knee protection device according to claim 11, wherein said gas bag has a rear and a front section, and wherein said flame protection wall is fastened to said rear section of said gas bag wall above and below said inflation opening and is spaced apart from said front section and is laterally open in the inflated state of said gas bag.

* * * * *